United States Patent [19]

Pick

[11] 4,245,259
[45] Jan. 13, 1981

[54] INERTIA DRIVE HEAD FOR OPTICAL SCANNING AND READOUT

[75] Inventor: George G. Pick, Mendham, N.J.

[73] Assignee: AM International, Inc., Los Angeles, Calif.

[21] Appl. No.: 882,505

[22] Filed: Mar. 1, 1978

Related U.S. Application Data

[63] Continuation of Ser. No. 709,276, Jul. 28, 1976, abandoned.

[51] Int. Cl.² .................. H04N 1/04; H04N 1/10
[52] U.S. Cl. .................... 358/285; 318/119; 358/293
[58] Field of Search .......... 358/285, 293; 318/119, 318/134

[56] References Cited

U.S. PATENT DOCUMENTS

| 3,652,793 | 3/1972 | Farr | 358/293 |
| 3,678,308 | 7/1972 | Howe | 318/119 |
| 3,867,675 | 2/1975 | Kitz | 318/119 |
| 4,047,792 | 9/1977 | Dale | 358/285 |

Primary Examiner—Howard W. Britton
Attorney, Agent, or Firm—A. W. Karambelas; R. S. Hulse

[57] ABSTRACT

The drawings illustrate the principles involved in an inertial shuttle device originally constructed to operate as an optical character recognition device and adapted to rapid photocomposition.

The shuttle is a scanning device which is inherently a very uniform and smooth scanning velocity device and utilizes only a minute amount of driving power. This combination is achieved by means of energy conserving springs which reverse the head very rapidly at the end of each stroke with windage and friction losses made up by a lightweight, low inertia drive motor which itself is variable in power input by alteration of current intensity supplied to the motor.

3 Claims, 5 Drawing Figures

INERTIA DRIVE HEAD FOR OPTICAL SCANNING AND READOUT

This is a continuation of application Ser. No. 709,276 filed July 28, 1976 now abandoned.

BACKGROUND OF THE INVENTION

Old techniques used to drive a linear shuttle of this type, which moves in a straight line, back and forth, over a flat-bed paper handler, utilized either powerful servo drives, which required substantial power, or utilized a scotch-yoke drive which yielded a sinusoidal motion, and also required substantial power. Other approaches utilized motors, clutches, and reversing gears.

Previous techniques would require two orders of magnitude more power in order to accomplish this same purpose, even with much lighter weight shuttles. Paradoxically, this increased power increases problems in speed stabilization, motor cogging, mechanism friction, all of which contributes to decreasing the angular stability and constant speed of shuttle motion.

SUMMARY OF THE INVENTION

An advantage of this invention is that an inertial shuttle, which inherently results in a very uniform and smooth scanning velocity, utilizes only a minute amount of driving power. This is achieved by means of energy conserving springs which reverse the head very rapidly at the end of each stroke. This method also results in maximum useful scanning time unlike other systems, which have a great deal of dead time between the scans.

DESCRIPTION OF THE PREFERRED EMBODIMENT

Figure 1:
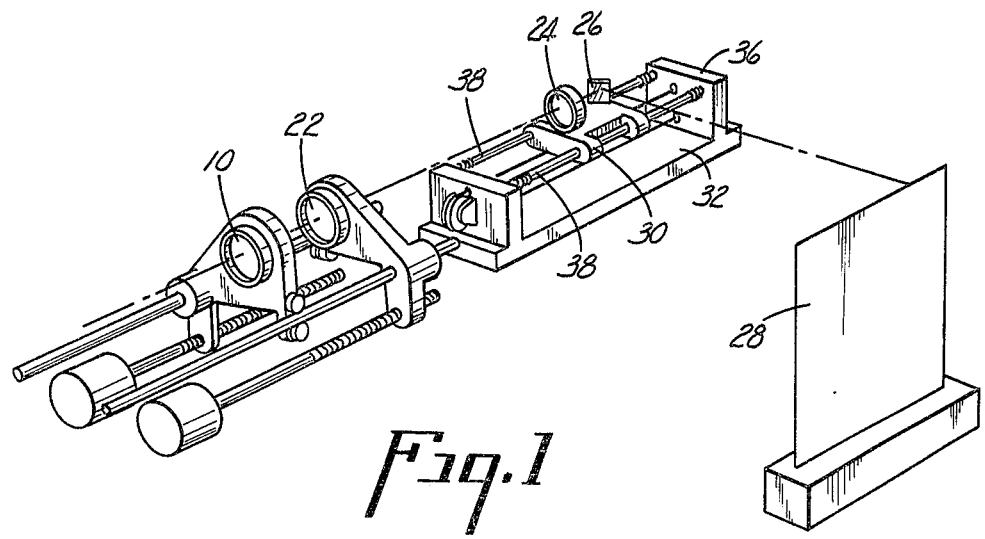
FIG. 1 is a perspective schematic of the optical system of a photocomposition machine embodying the concepts of this invention.

FIG. 1 illustrates the essence of an optical system and escapement portion of a photocomposition machine of the present invention which has been successfully reduced to practice.

Figure 3:
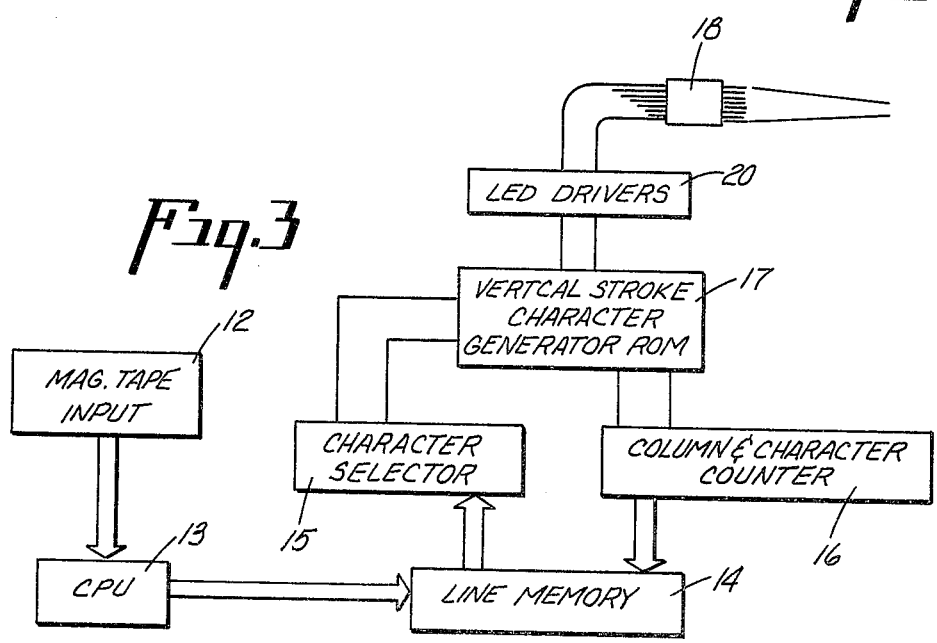
FIG. 3 illustrates a known means of electronic character generation by a light emitting diode array coupled to the optical and shuttle system of FIGS. 1 and 2.

The machine illustrated operates on the principle of a variable position lens 10 for producing an initial size aerial image according to the point size desired to be printed. A source of characters is suggested in FIG. 3. The FIG. 3 is a schematic illustration of known electronic principles for producing a character generator where a tape input, such as a magnetic tape input 12 is employed to drive the character generator. The tape input itself may be generated from an optical storage device, such as the conventional disc font sources well-known in the photocomposition business. However, such optical system can only be used as the raw data memory which is then buffered by entry into the generator through the magnetic or other input 12.

From the input 12, the central processing unit 13 supplies a line memory 14 which is then coordinated with the character selector 15 and a column and character counter 16 associated with a vertical stroke character generator 17. The block 18 represents an array of light emitting diodes. The array 18 is driven by the LED drivers 20. The output from the array 18 is detected by the lens 10 referred to in the structure illustrated in FIG. 1. The lens 10 is a variable position lens in order to produce an aerial image of predetermined size according to the desired output size from the machine.

The image projected through the lens 10 is then collimated by collimating lens 22. The collimated beam is independent of a focal point, hence, may be decollimated by lens 24 in any longitudinal position.

Figure 2:
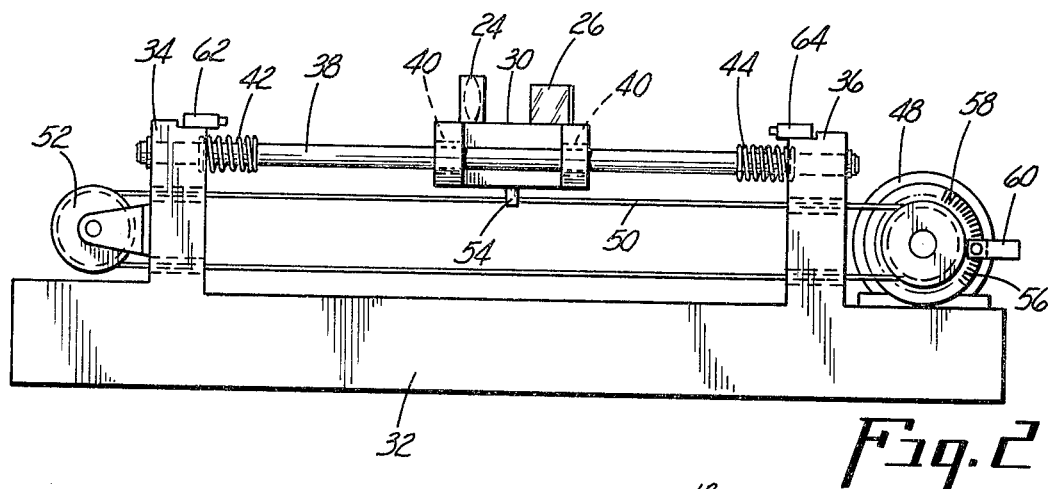
FIG. 2 is a side elevation of the inertial drive shuttle escapement mechanism shown in FIG. 1.

The construction and operation of a shuttle carriage 30 is explained by reference to the FIG. 2. FIG. 2 is an operative structure, although not necessarily a commercial form and configuration useful in a particular photocomposition machine.

A base 32 carries upright stanchions 34 and 36. Way rods 38 support the carriage 30 on low friction bearings 40. Energy absorbing resilient bumper means in the form of springs 42 and 44 absorb the kinetic energy of the head 30, which has a finite mass, and brings that mass to a stop. Thereafter, the particular spring which has been impacted will apply the energy absorbed in a recoil action to reverse and drive the mass to the opposite terminal spring. That spring will then repeat the operation of absorbing the kinetic energy and reversing the motion of the mass of the head 30.

A system which has no windage or friction losses could thus become a perpetual motion device, but of course these slowing factors exist in all mechanical structures. Therefore, a very low inertial motor 48, such as those made by Micro-Switch Corporation of the United States, is used to provide both initial start-up reciprocating motion of the carriage 30, and thereafter the control and make-up energy necessary to operate the head indefinitely. Motor 48 is not shown in FIG. 1, being hidden behind the stanchion 36. The motor drives the shuttle carriage 30 through the instrumentality of a wire 50 reeved about a pulley 52 and connected to the carriage 30 at point 54.

The motor 48 carries a means for determining both its rotative position and its speed of operation by means of a tachometer or angle encoder or a linear encoder on shuttle 30 or by a motor voltage sensing device. The FIG. 2 illustrates an angle encoder in the form of a disc 56 very similar to the disc font source of many present-day phototypesetters, but having only a timing track 58. The timing track marks are read by a head 60 substantially identical to the head used on phototypesetting machines employing rotating font discs.

A central processing unit (CPU) 13, which is part of the controller for the entire photocomposer, receives rotary position and speed information from the read head 60, and supplies a variable voltage to the motor 48 for the control of the speed and power input to that drive motor.

The motor 48 is given full power at the start-up of the machine, and will drive the shuttle carriage 30 in one direction or the other according to where it was at the previous shutdown, until it contacts the reversing switch. Thereupon the motor 48 is reversed and receives full power to drive the shuttle carriage 30 towards the opposite terminal whereupon contacting of that terminal switch will once again reverse the head. Thus, the start-up is accomplished by full drive power to obtain the initial shuttle and allow the shuttling motion to settle into a rythmatic oscillation. Thereafter, the current regulator will be controlled to supply the proper amount of power to the motor 48 in the proper direction and in the proper timing in order to maintain the shuttle 30 at a desired shuttling speed. The linear position of the shuttle is always accurately ascertainable by the CPU due to reading of the timing marks 58 on the disc 56.

Likewise, the output of array 18 is controlled by the CPU and accordingly these two speeds are capable of being coordinated. Accordingly, by the use of the rapidly oscillating shuttle carriage 30, accurately ascertainable as to position, enables the far greater and accurate photocomposition of text material.

Figure 4:
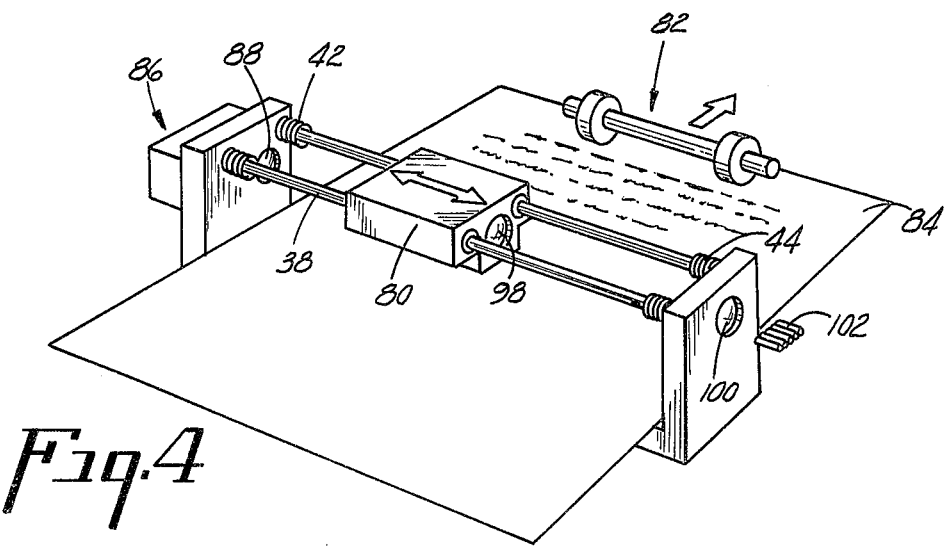
FIG. 4 illustrates an adaption of the inertial drive shuttle's principle for optical character recognition.
Figure 5:
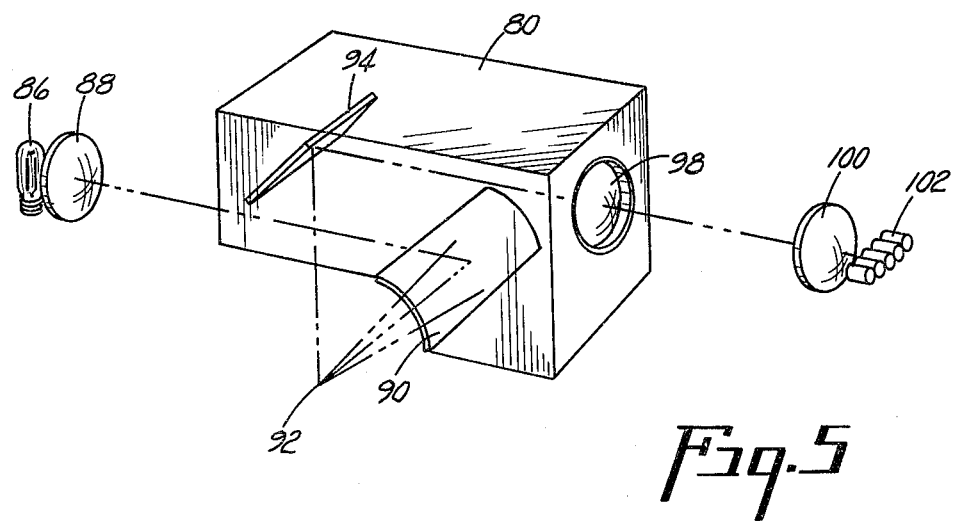
FIG. 5 is a detail of the adapted shuttle head of FIG. 4.

Also, tested and shown to be fully operative, is an optical character recognition adaptation of the shuttle principle. The FIGS. 4 and 5 illustrate the manner in which the invention is used for optical character recognition. The carriage is indicated by reference character 80 and is set apart in FIG. 5 in order to show detail not readily capable of being illustrated in FIG. 4. It will be recognized that the FIG. 4 is not complete as to the actual reduction to practice, being an illustration of principle only for clarity.

The construction of all support apparatus, including the oscillating drive motor is essentially identical to that shown in the previous figures, and hence omitted from FIG. 4. The carriage 80 is mounted on the way rods 38 and the reversing springs 42 and 44 are located and operate in identical manner.

A paper drive device is suggested by the conventional advancing rollers 82 and these are driven by a stepping motor through a drive train suitable to provide a uniform advancement of a hard-copy sheet 84 through the bed of the machine.

Referring to FIG. 5, the essential differences between the construction of the photocomposition adaptation and the optical code recognition adaptation is apparent. In this adaptation for optical character recognition, a light source 86 is a steady light source rather than flash. A lens 88 is a collimating lens which gathers radiant light energy from the source 86 and beams a column of the energy to a cylindrical segment mirror 90. The mirror 90 decollimates the beam from lens 88 and focuses the light energy into a narrow line segment at the point 92. Point 92 is at the surface of the machine 84 and hence concentrates a strong light beam in a very narrow area on a sheet carried therethrough. The length of the beam is designed to be essentially the height of the maximum size character which is normally encountered in such optical character recognition.

The illuminated character is reflected into a mirror 94 and projected through a collimating lens 98. The beam from the collimator 98 corresponds roughly to the beam projected by the lens 22 in FIG. 1, and therefore the longitudinal position of carriage 80 is eliminated as a factor in the projection of the information obtained.

A decollimating lens 100 then refocuses the information onto a series of photodetectors 102 and information thus obtained is digital in nature. The digitalized information is then supplied to the CPU for processing in the known manner of character recognition devices. The character recognition is a known technology not a part of this invention. This invention is capable of rapidly obtaining digitalized conversion of printed characters for input to such known devices.

What is claimed is:

1. An oscillating motion machine for reading from and recording onto a record medium, the machine comprising:
    an inertial drive shuttle carriage of finite mass;
    way means;
    bearing means mounting said carriage on said way means for reciprocal oscillation;
    a first and second terminal spaced apart with said way means and carriage therebetween;
    spring means disposed at each terminal for intercepting said carriage, said spring means absorbing the kinetic energy of said finite mass to bring the mass to a stop, and thereafter applying the energy in a recoil action to propel said mass to the opposite terminal;
    a pulley means disposed relative to the first terminal; and
    a motor drive means disposed relative to the second terminal and coupled to the pulley means and to the carriage for imparting startup motion to the carriage, and thereafter supplying makeup energy to keep the carriage in oscillating motion in response to an applied voltage.

2. The machine as in claim 1 wherein the motor drive means is coupled to the carriage and to the pulley means via a cable and includes a disc with timing marks.

3. The machine as in claim 2 wherein the voltage applied to the motor drive means is variable in accordance with the angular position and speed of the motor as determined from the timing marks on the disc.

* * * * *